J. C. BUTTERFIELD.
ATMOSPHERIC HAMMER.

No. 264,859. Patented Sept. 26, 1882.

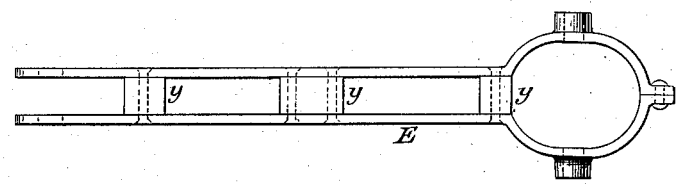
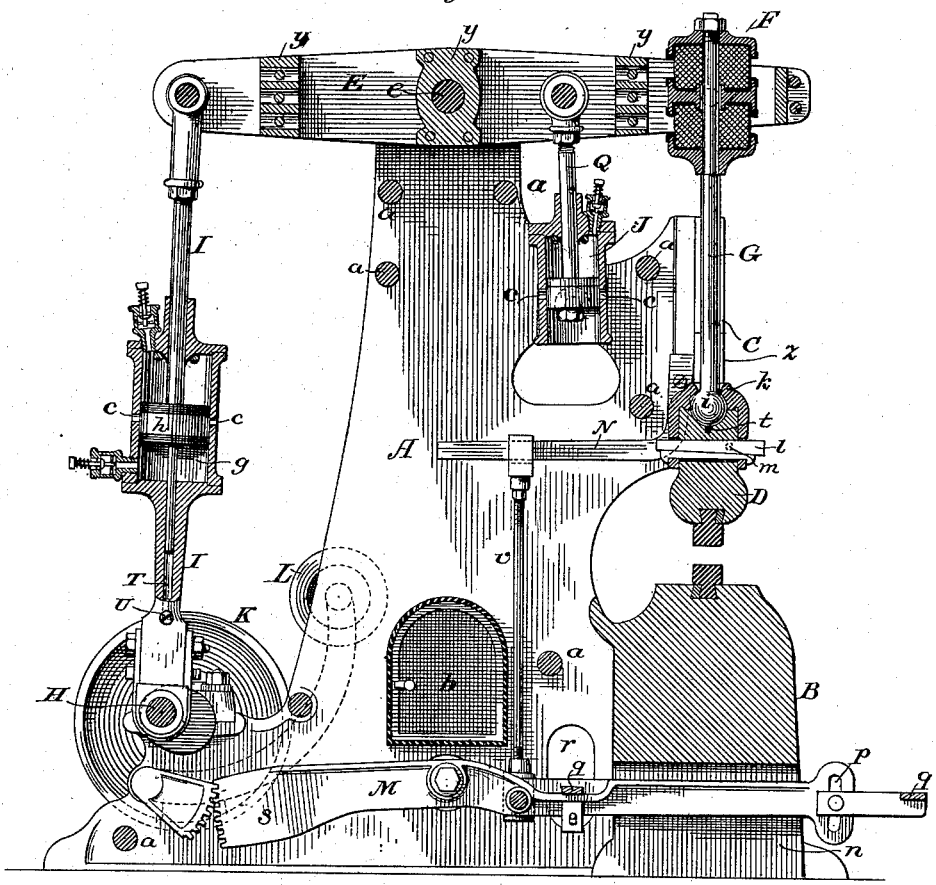
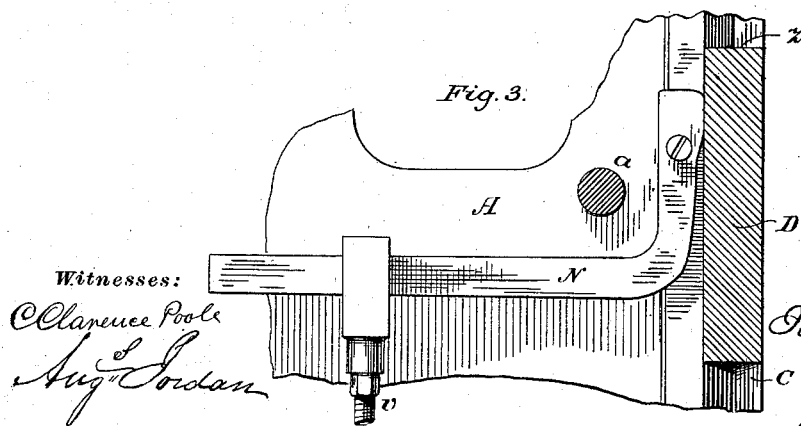

J. C. BUTTERFIELD.
ATMOSPHERIC HAMMER.

No. 264,859. Patented Sept. 26, 1882.

Witnesses;
C Clarence Poole
Aug. Jordan

Inventor;
John C Butterfield
By R. D. Smith
Attorney.

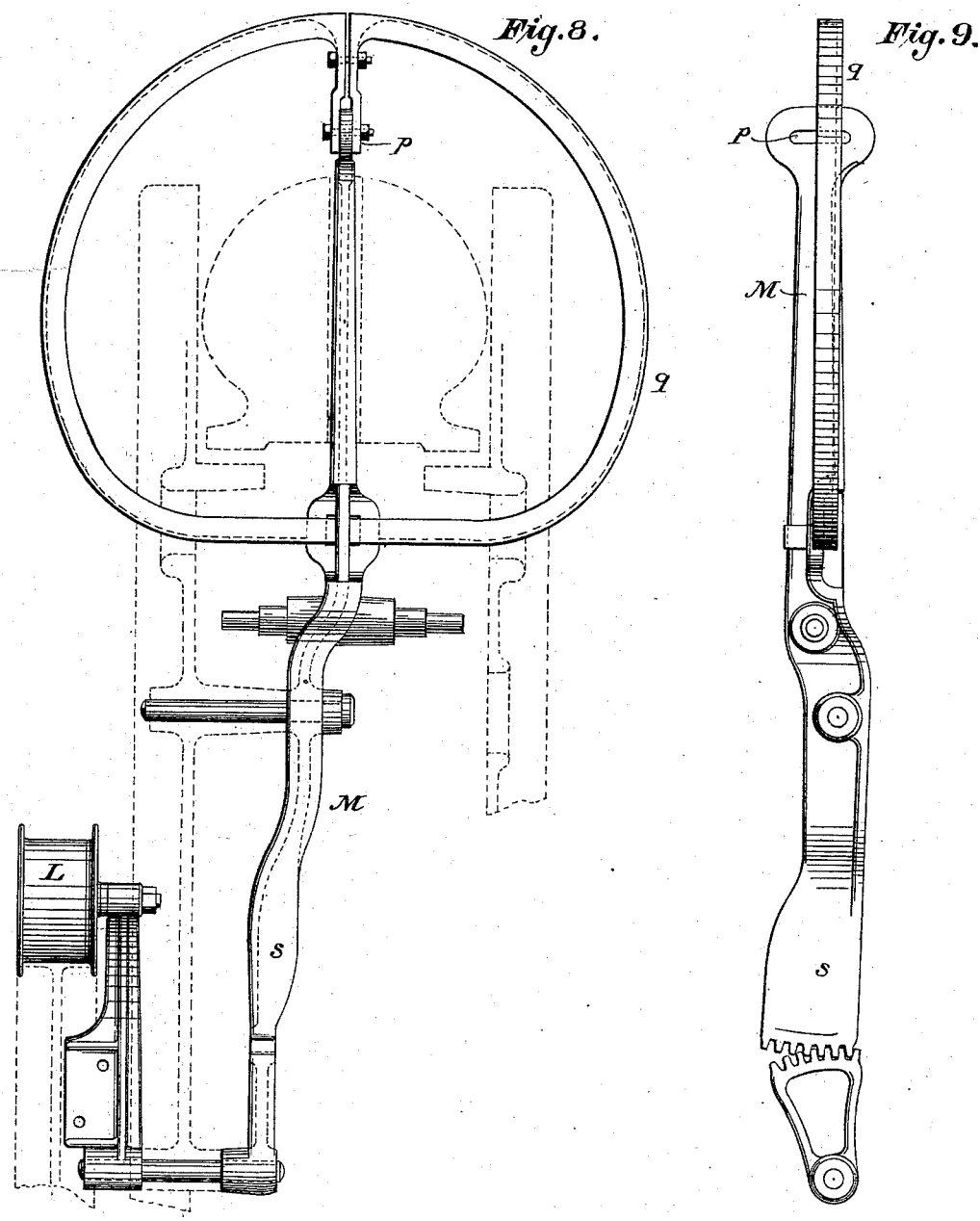

J. C. BUTTERFIELD.
ATMOSPHERIC HAMMER.

No. 264,859. Patented Sept. 26, 1882.

Witnesses;
C. Clarence Poole
Aug. Jordan

Inventor;
John C. Butterfield
By C. O. Smith
Attorney.

J. C. BUTTERFIELD.
ATMOSPHERIC HAMMER.

No. 264,859.          Patented Sept. 26, 1882.

UNITED STATES PATENT OFFICE.

JOHN C. BUTTERFIELD, OF CHICAGO, ILLINOIS.

ATMOSPHERIC HAMMER.

SPECIFICATION forming part of Letters Patent No. 264,859, dated September 26, 1882.

Application filed October 21, 1879.

*To all whom it may concern:*

Be it known that I, JOHN C. BUTTERFIELD, of Chicago, Cook county, in the State of Illinois, have invented a new and useful Improvement in Power-Hammers; and I do hereby declare that the following is a full and complete description of the same.

My invention relates to the atmospheric hammer for which Letters Patent No. 176,400 were granted to me April 18, 1876. For a description of the general structure and mode of operation of my hammer I therefore hereby refer to my patent above named.

My present improvement consists, first, in an improved connection between the hammer-head and hammer-rod; second, in the tightener-lever located centrally in the machine; third, in a hammer-head brake; fourth, in an adjustable head in the cylinder to regulate the length of stroke; fifth, in a wrought-metal walking-beam constructed in the manner hereinafter described.

That others may fully understand my improvement, I will particularly describe the same, having reference to the accompanying drawings, wherein—

Figure 1:
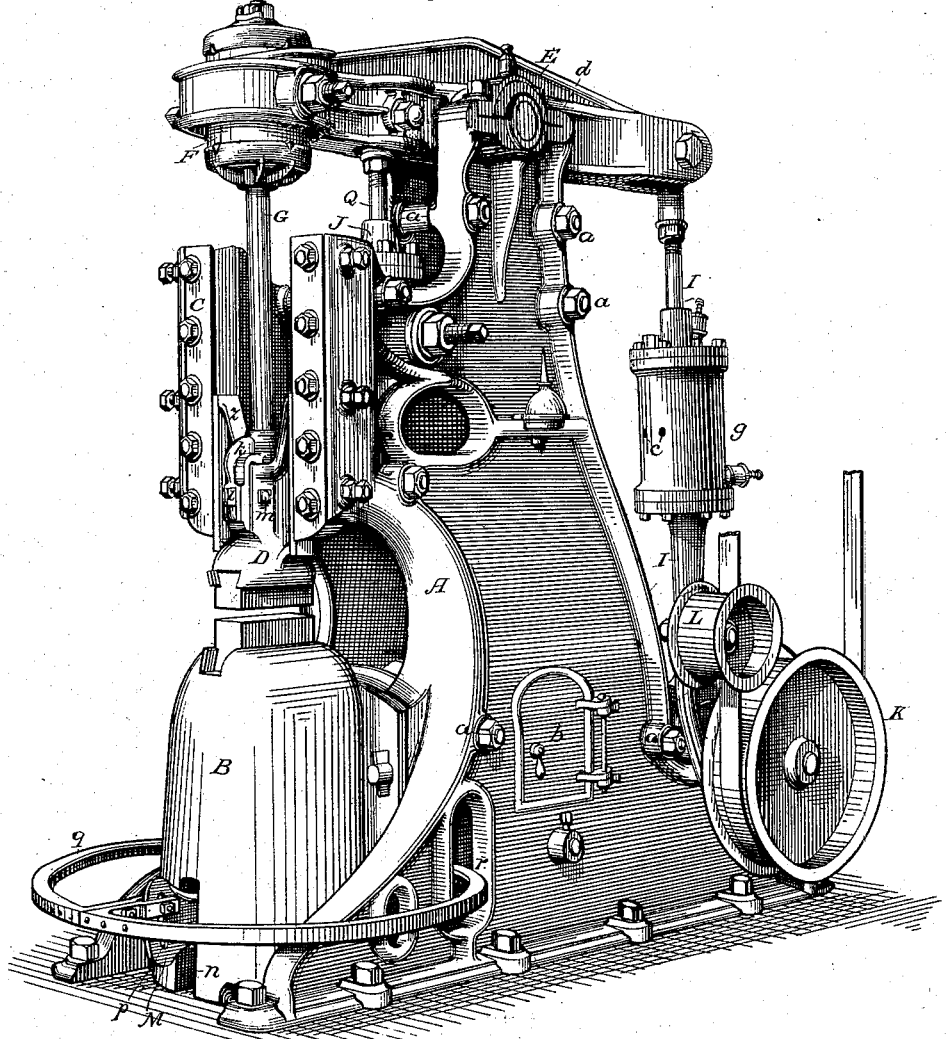
Figure 4:
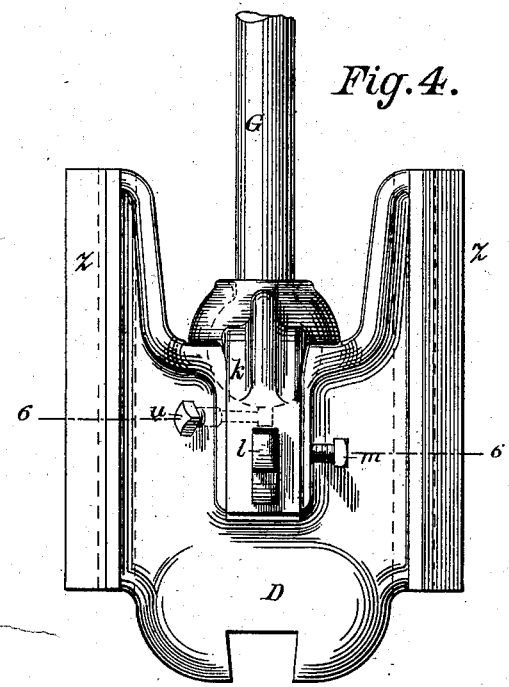
Figure 5:
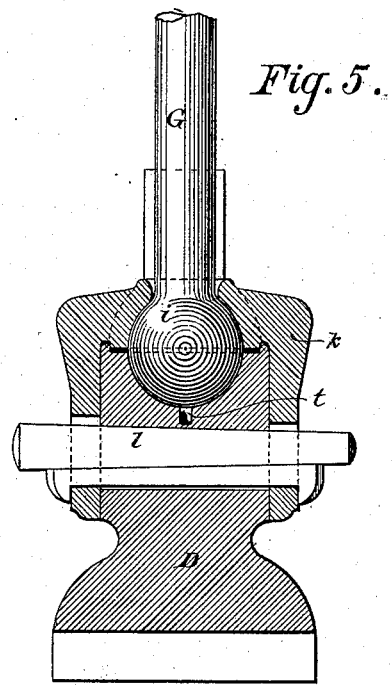
Figure 7:
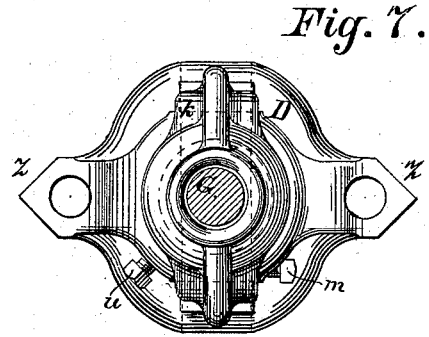
Figure 6:
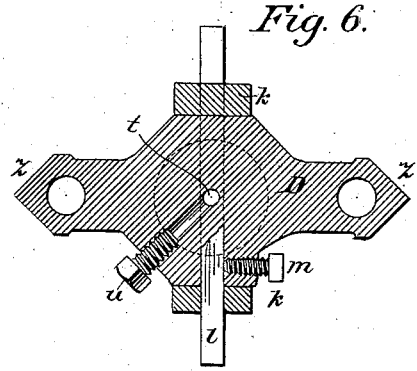
Figure 10:
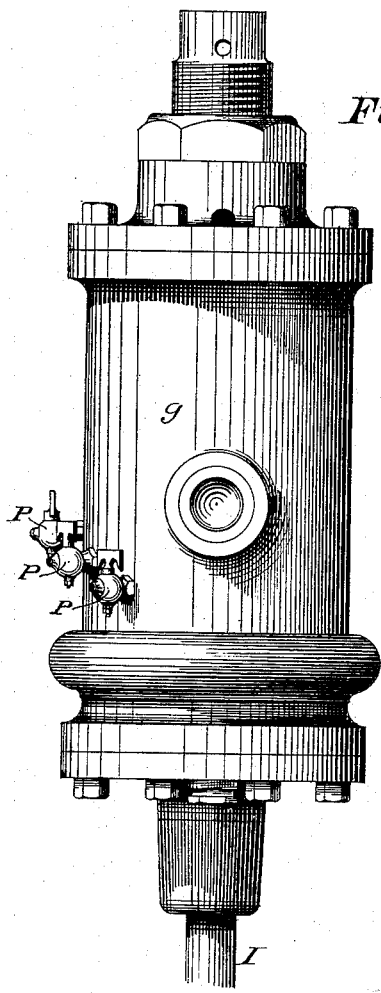
Figure 11:
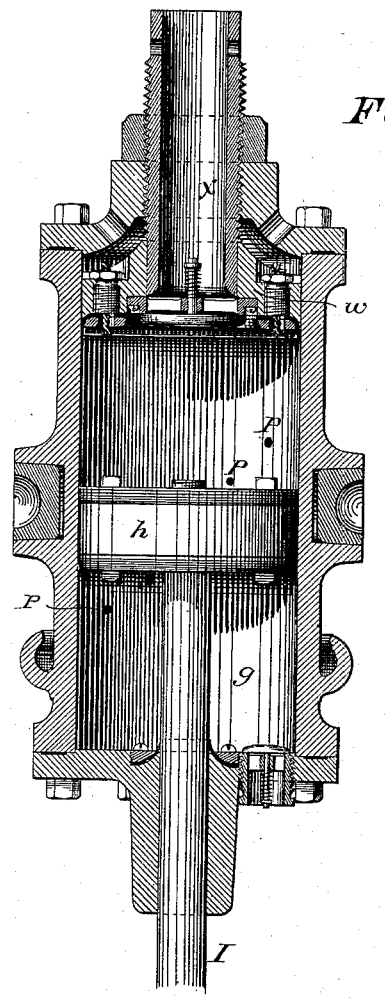
Figure 12:
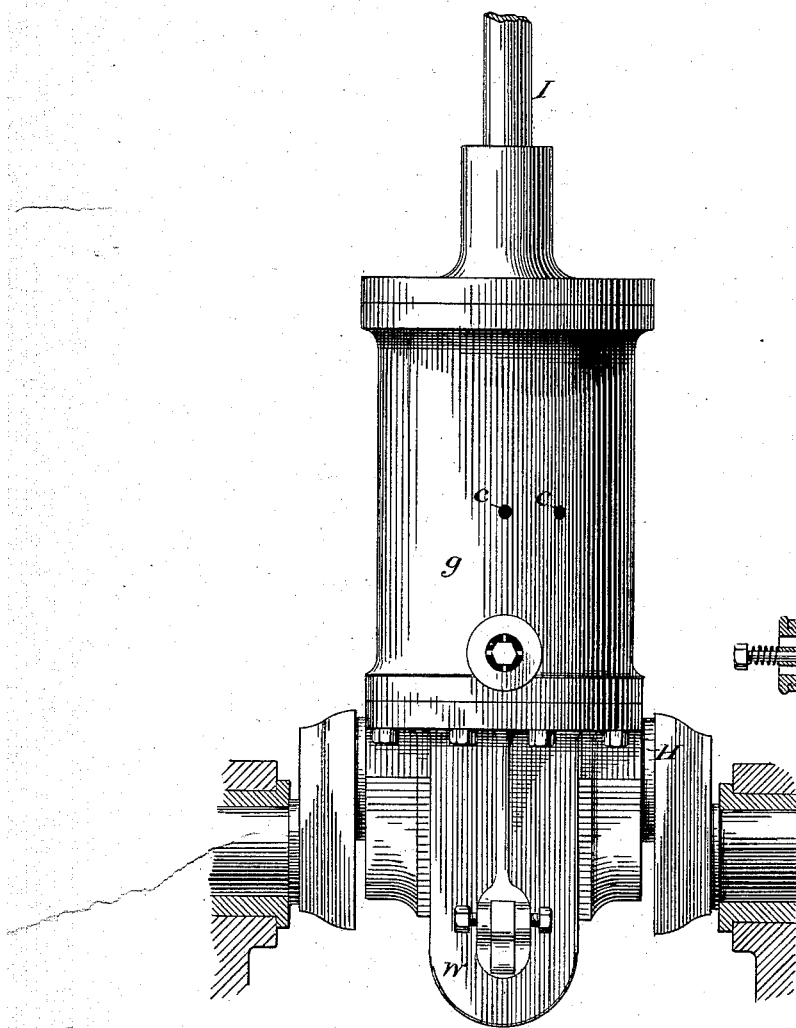
Figure 13:
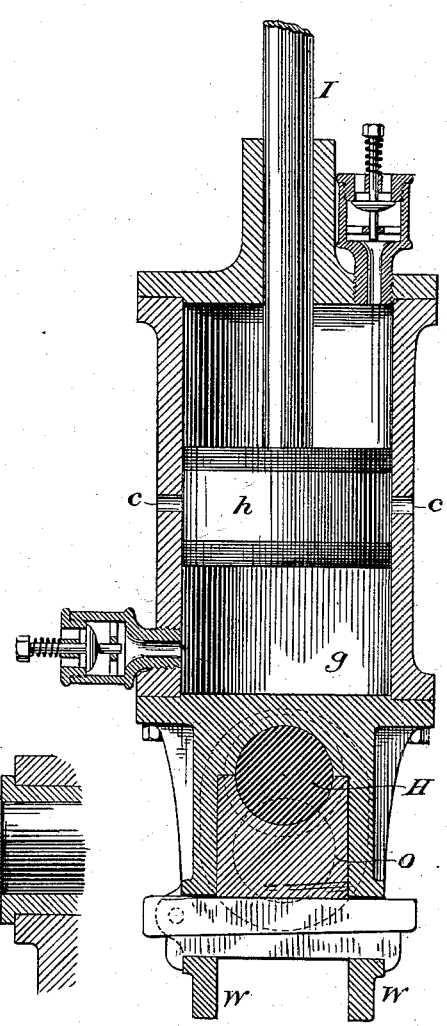

Figure 1 is a perspective view of my hammer complete. Fig. 2 is a central sectional elevation of the same. Fig. 3 is an enlarged section, showing the hammer-brake in elevation. Figs. 4, 5, 6, 7 represent the hammer-head and connection in elevation, section, and plan. Figs. 8 and 9 represent the tightener-treadle in plan and elevation. Figs. 10 and 11 represent my cylinder with adjustable head in elevation and section. Figs. 12 and 13 represent my cylinder set low upon the crank.

A is the frame of my hammer, constructed of cast-iron or otherwise, as preferred. For convenience, and, as I think, preferably, said frame is made in two parts joined and rigidly fastened together by bolts $a\ a$. I am thus enabled to facilitate construction and conveniently to place a tool-closet, $b$, within the unoccupied space between said plates.

The anvil-block B is fitted to the front of the frame A and is bolted fast thereto; but it stands upon its own foundation, and the frame A is not required to bear any of the shock of the hammer blow.

Guides C for the hammer-head slide Z are bolted to the front of the frame above the anvil-block, so that the hammer-head D has a vertical movement above the anvil.

At the top of the frame A there are boxes $d$ for the journals $e$ of the walking-beam E. At its front end the beam E carries the elastic shock-absorbing cushion and coupling F, whereby the hammer-rod G is coupled to the walking-beam E. At the rear end the beam E is coupled to the driving-crank H by the pitman I, which is made in two parts, one part forming a cylinder, $g$, and the other part a piston, $h$, fitted to said cylinder, whereby the atmosphere is used as a medium through which motion is imparted to the walking-beam by the compression thereof in the opposite ends of said cylinder alternately. There is also an air-cylinder, J, hung upon trunnions between bearings on the frame A. Said cylinder is fitted with a piston, and the upper end of its piston-rod Q is connected with the beam E in front of the journal $e$. When the hammer-head is raised air is compressed in the upper end of the cylinder J, and the upward thrust of the hammer is thereby cushioned and upward thrust of the journal $e$ is prevented.

A driving-belt runs loosely upon the pulley K, and is controlled, as usual, by a tightener, L, and treadle M. These are, in general terms, the characteristic parts of my invention referred to in my patent above named, upon which the devices hereinafter described are improvements.

I will now particularly describe the improvements hereinbefore referred to as forming the subject of this patent.

The hammer-head D has a rectilineal motion, and the point of connection between the hammer-rod G and the walking-beam E moves in a circular arc. It is therefore necessary to provide for the consequent change in direction of the hammer-rod at each reciprocation of the hammer. Heretofore I secured the requisite flexibility by a fork in the hammer-rod and a transverse joint-pin. I now prefer to make the hammer-rod with a spherical head, $i$, and provide a corresponding socket for the same in the top of the hammer-head. The head $i$ is confined in said socket by a cap, $k$, which is provided with two pendent arms, which are secured to the hammer-head by a gib and key, *l*. The joint can also be tightened up by driving the key, as usual. A set-screw, *m*, may also be employed to prevent the shock of the hammer-blow from starting the key back and loosening the joint.

At the bottom of the socket for the head *i* an oil-pit, *t*, is bored, and this has a discharge-hole stopped by a screw, *u*, which may be removed and the waste and dead oil and gum discharged from said socket whenever necessary. There is a similar oil-pit, T, and stop-screw U at the bottom of the cylinder *g*.

In my patent above named the tightener-treadle M is described as placed entirely outside of the frame of the machine and curved around the front of the same. Consequently the treadle was more or less liable to accident and obstruction, and was also somewhat more sensitive on one side than on the other. To obviate these defects I place the treadle M between the side pieces of the frame and let it project through a slot, *n*, in the base of the anvil-block B.

At the front end of the treadle there is a transverse slot, *p*, for the purpose of adjusting the foot-bar *q* up or down, as may be desirable. The foot-bar *q*, being attached to the end of the treadle M, curves around the base of the anvil-block at a suitable distance away from the same, and enters the side plates, A, on each side through orifices *r*, and is again secured to the treadle M behind the anvil-block.

The rear end of the treadle M is weighted at *s*, to cause it to drop quickly to release the driving-power.

It is of considerable importance to stop the hammer-head quickly when the power is thrown off, both for the purpose of relieving the working parts of the machine and to keep it out of the way of the operator and his work. So far as I know, this has never been done heretofore. I therefore place against the inner faces of the frame-plates A, on each side, a clamp-lever, N, which is pivoted near one end to the frame, and its end closely contiguous to the hammer-slide, so that when the other end of said lever is raised or lowered it clamps said slide or releases it, as the case may be, and when the hammer-slide is so clamped its motion is arrested quickly.

The lever N at its long end is connected by a rod, *v*, with the treadle M, and it is coupled to said lever by an adjustable slide, so that the relative motion may be regulated at pleasure.

It is evident that this hammer-brake may be arranged and operated in a variety of different ways. I do not propose to limit myself to the exact form or arrangement herein shown, because I think that any brake applied to arrest the hammer when the power is thrown off will be substantially my invention.

The movement of the piston is dependent upon a certain pressure due to compression of the air between the cylinder-head and the piston, and it is evident, therefore, that a short cylinder will impart a shorter stroke than a long cylinder will do, because the desired pressure will be more quickly attained, and I have therefore made one head of my cylinder adjustable to increase or diminish the effective length of the cylinder. (See Figs. 10 and 11.)

As shown in Fig. 11, the head *w* is inserted within the cylinder and mounted upon the hollow screw-stem *x*, by the turning of which said head may be moved out or in, as desired.

I have also made a graduated exhaust by inserting cocks P at different points as to the length of the cylinder, either or all of which may be opened to admit and exhaust air, as before mentioned. It is apparent compression will not commence until the piston has passed the last open cock. The stroke is not thereby shortened, but its force is graduated.

When the head is adjusted and full force of stroke is required that cock P which is at the center of the stroke is opened for exhaust and the remainder are closed. In that way the exhaust-port is made adjustable as well as the cylinder-head.

When the hammer is large the weight and inertia of the walking-beam is increased so greatly that the rapid change of motion in such a mass becomes a matter of importance. I therefore place the cylinder down upon the crank, as shown in Figs. 12 and 13. The lower head of the cylinder is provided with two arms, W, projecting downward from said head, and the upper half of the box is inclosed between said arms, being either cut in the solid or made in a separate block, as heretofore. The cap O is fitted also between said arms and secured by gib and key, as is usual.

The block O may be made heavy to serve as a counter-weight for the cylinder, to neutralize its side thrust at the top against the piston-rod.

My walking-beam E is constructed with two plates of wrought metal of requisite width and thickness, separated by a distance sufficient to admit the joint-heads of the piston-rods I and Q, so that the joint-pins of said heads have supports at each end. The said plates are securely bolted through cast-iron blocks *y y*, which maintain said plates at a proper distance and unite them in a single rigid structure. At the front end the plates are curved outwardly and again united, so as to form a circular loop to inclose the cushion F, which is mounted upon pivot-bolts at its center.

Having described my invention, what I claim as new is—

1. The hammer-head D, with its cap *k* and socket for the spherical head *i*, provided with an oil-pit, *t*, and outlet stopped by the screw *n*.

2. In combination with the reciprocating hammer D, the brake-lever N, pivoted to the inner face of the hammer-frame A, and coupled to the tightener-treadle M by the rod $v$, as set forth.

3. In an upright power-hammer driven by a loose belt and controlled by a tightener-pulley, a tightener-treadle, M, placed between the side plates of the machine and projecting at the front through a slot, $n$, in the base of the anvil-block, combined with a foot-bar, $q$, surrounding said anvil-block and connected with said treadle in front and rear of the same, as set forth.

4. The cylinder $g$ and piston $h$, combined with an adjustable head, $w$, mounted upon the screw-stem $x$, whereby said head may be advanced or withdrawn in said cylinder to shorten or lengthen the hammer-stroke, as set forth.

5. The cylinder $g$ and piston $h$, combined with a series of cocks, P, set at different points as to the length of the cylinder, for the purpose of adjusting the force of the hammer-stroke, as set forth.

6. In an atmospheric power-hammer wherein the power is communicated from the driver of the walking-beam by means of a cylinder carried by a crank and a piston which actuates the walking-beam, the cylinder $g$, with the box V for the crank, attached directly to the cylinder-head, for the purpose of setting the cylinder close upon the crank, as and for the purpose set forth.

JOHN C. BUTTERFIELD.

Witnesses:
R. D. O. SMITH,
N. B. SMITH.